July 10, 1956 E. SANTONI 2,753,756
PHOTOGRAMMETRIC PLOTTING APPARATUS
Filed Aug. 18, 1953 3 Sheets-Sheet 1

INVENTOR:
ERMENEGILDO SANTONI

BY Richardson, David and Nordon
ATTORNEYS

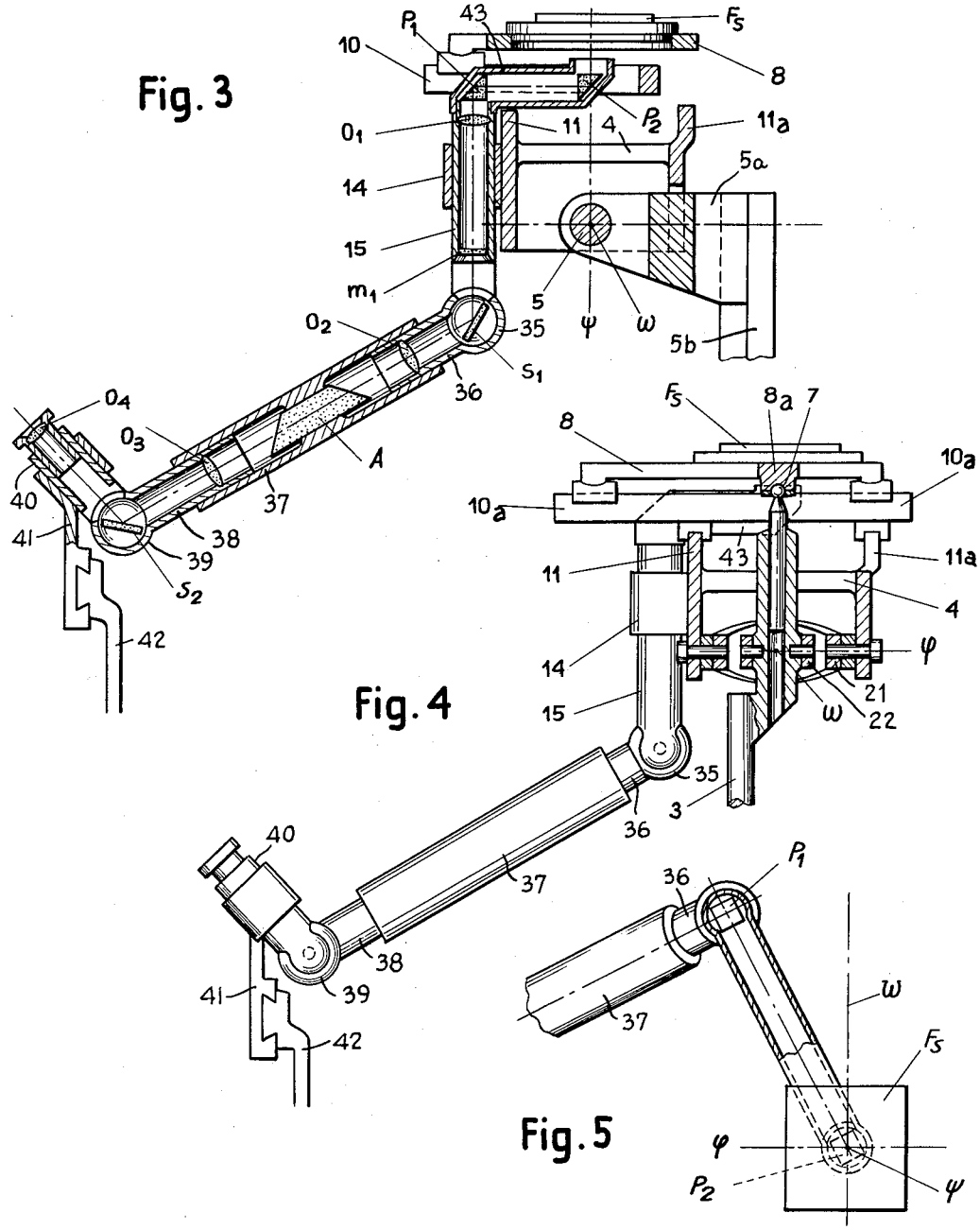

July 10, 1956   E. SANTONI   2,753,756
PHOTOGRAMMETRIC PLOTTING APPARATUS
Filed Aug. 18, 1953   3 Sheets-Sheet 3
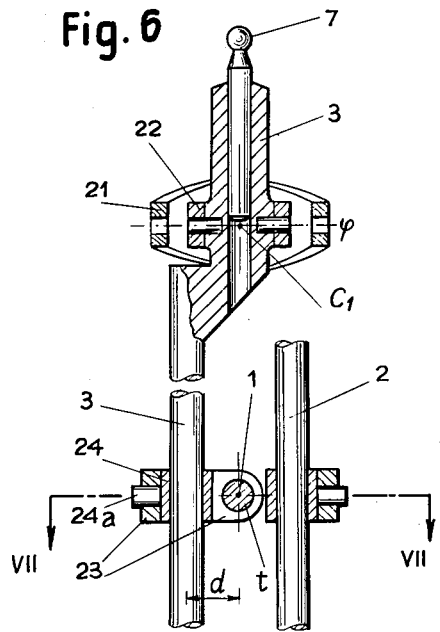
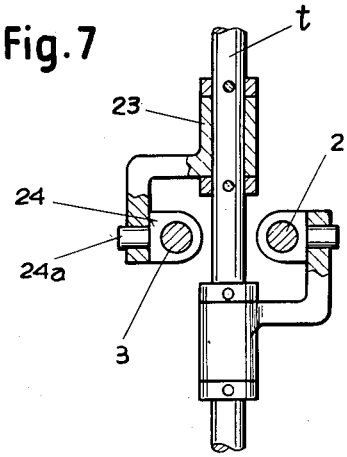
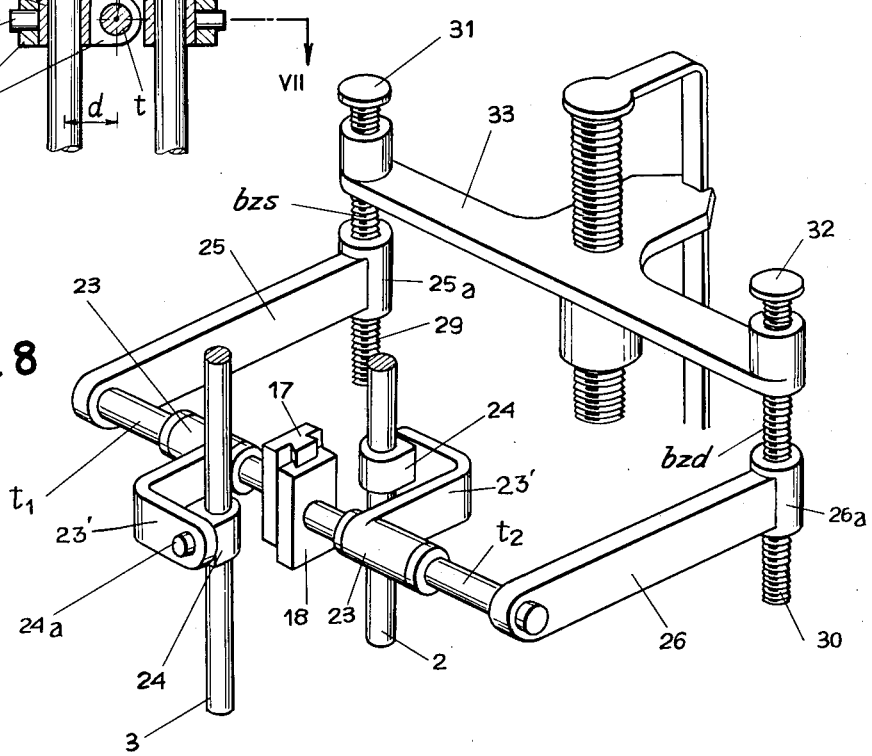
INVENTOR:
ERMENEGILDO SANTONI
BY Richardson, David and Nordon
ATTORNEYS

United States Patent Office 2,753,756
Patented July 10, 1956

2,753,756
PHOTOGRAMMETRIC PLOTTING APPARATUS

Ermenegildo Santoni, Florence, Italy

Application August 18, 1953, Serial No. 374,895

Claims priority, application Italy August 25, 1952

4 Claims. (Cl. 88—24)

The invention relates to a photogrammetric plotting apparatus improved respect that described in the U. S. Patent No. 2,574,123.

Said abovementioned patent substantially relates to a mechanical projection photogrammetric plotting apparatus wherein each of the two guide rods, which is hinged with an universal joint in the relative centre of projection, determines the displacement of the photogram, which is mounted on a movable bearing by effect of a cross-slide system, in its plane, while the collimation optical system is stationary during the plotting. The photogram is laterally displaced in accordance to two components ($xy$) in order to allow the collimation of said photogram from the top towards the bottom, that is, from the same side where the universal joint, which materializes the centre of projection, in relation to the attachment spherical coupling of the guide rod to the photogram bearing. The observation optical system is composed of a first objective lens which leads the image of the photogram above the collimation mark, of a first pivotal differential mirror, of a second objective lens which propects said image according to parallel beams together with the mark towards an Amici prism, of a third objective lens located behind the Amici prism, of a second pivotal differential mirror, in order to actuate a new formation of an actual image in the focal plane of the observation ocular unit; the optical system is pivoted in correspondence of the mirrors and has a variable length within the second and third objective lens so as to allow the system, carrying the photograms, to be controlled by the spacing movements for the imposition of the base and by the rotation for the angular imposition necessary for the plotting of a stereogram executed in any condition of shooting.

The accuracy attainable with the apparatus of the above mentioned patent is bound to the condition that each photogram may effect any movement, which is the most possible equal to that effected by the corresponding spherical coupling carried at the end of each rod which materialises the optical travel converging in the spot to be plotted; this spherical coupling is linked to the bearing of the corresponding photogram, the centre of which is displaced in accordance to said components ($xy$) respect the spherical joint. This arrangement is such that a small inaccuracy of the cross slides or a small play between the latter and the photogram bearing, sliding on said guides, determine anomalies or delays in the movement of the photograms' bearings. These errors are smaller when the centre of the photogram is nearer the spherical joint connecting the bearing of each photogram and the same photogram.

A scope of the present invention is to eliminate the above mentioned errors, which may be found in the apparatus described in the above mentioned patent. According to the invention, in the observation optical system relative to each photogram, the optical axis which is extended from one of the differential mirrors perpendicularly to the photogram, rather than being rectilinear, includes a deviation obtained by optical reflecting means in order to approach the observation spot to the above mentioned spherical joint and thus decrease until to also annul at least one of said components ($x$—$y$).

In the photogrammetric plotting apparatus of the specified type, involving guide rods universally jointed in the centres of projection, an additional problem of actuation is that relating to the reduction of the distance between the centres of projection so as to reach, if possible, according to an appropriate scale, the equivalence to the stereoscopic shooting base, besides the one relating to the introduction of additional correctives for the distance (component $bz$); said distance being added to the stereoscopic base. A second scope of the present invention is the resolution of said two problems by arranging the guide rods in such a way as to be intersected in the spot, which represents, every time, the plotted spot, and by arranging the two centres of suspension of said rods in such a way so that they may be susceptible of a relative displacement. Thus it is possible to attain an accuracy necessary when the apparatus has been improved through the above mentioned arrangement relative to the reduction or annulment of the displacement between the connection coupling of the photogram bearing with the rod and the centre of the relative photogram.

The guide rods, according to the invention for said second scope, are cylindrical and means are provided so that the intersection of the geometrical axis of said rods may be virtually obtained, rather than directly as in the known above mentioned case. Moreover, there is a preferably horizontal support or bearing between the couplings, to which said guide rods are connected at the bottom; this bearing may be broken in two sections, preferably having the same length and relatively displaceable in height through two independent controls. It is possible in this way to introduce the additional correction for the distance, that is, the component $bz$ of the shooting base, said correction replacing the similar correction of the stereoscopic base; the theoretical triangle of intersection is thus transformed into a trapezium having an equivalent functionality.

The drawings show a few embodiments.

Fig. 3 is a cross-section along the line III—III of Fig. 2, the section also extending along the optical axis of the observation optical system;

Fig. 4 is a view along the line IV—IV of Fig. 2;

Fig. 5 is a diagram of a modification of the solution of the previous figures;

Figs. 6 and 7 are a longitudinal cross-section and a cross-section along the line VII—VII of Fig. 6 respectively of an embodiment of the plotted spot or point, in the case equivalent to the intersections in a point of the two rods;

Fig. 8 is an embodiment for the case wherein the connecting bearing between the joints of the guide rods is divided in two vertically movable portions.

Figure 1:
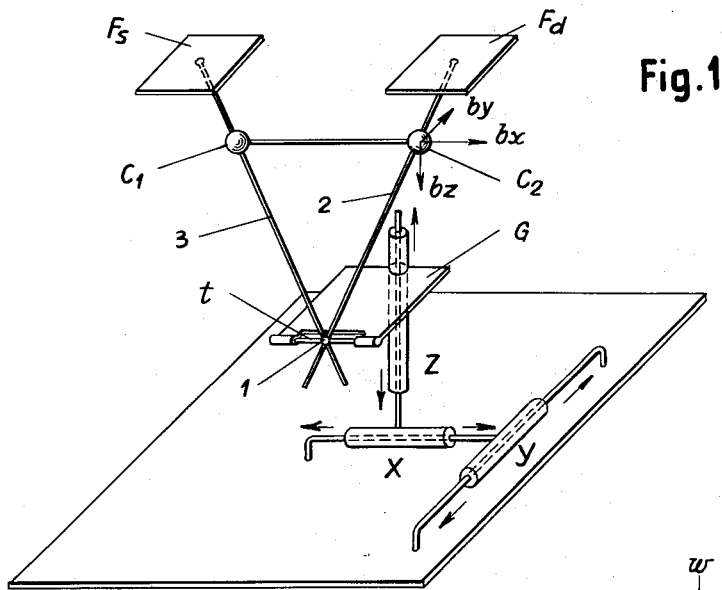
Fig. 1 shows a theoretical diagram of a plotting apparatus of the type in question.

In the diagram of the mechanical projection plotting apparatus of Fig. 1, $F_s$—$F_d$ denote the photograms; $C_1$—$C_2$ denote the centres of projection, 1 denotes the plotted spot, 2 and 3 the guide rods intersecting the spot 1. The spot 1 is movable in the space through a carriage G slidable in the three directions X, Y, Z; each shooting camera, besides the angular movements ($\omega$ and $\varphi$) not indicated in the diagram for simplicity of specification, is provided with linear movements $bx$, $by$, $bz$, in order to impose the scale arranged for the plotting. The plotted spot or point 1 is supported by a rod support $t$ in the diagram.

The point 1 corresponds to the spot or point 14 or 28 of the above mentioned patent which materialises the plotted spot; the two guide rods 2 and 3 correspond to the rods 11 and 13 or 27' of the above mentioned patent.

Figure 2:
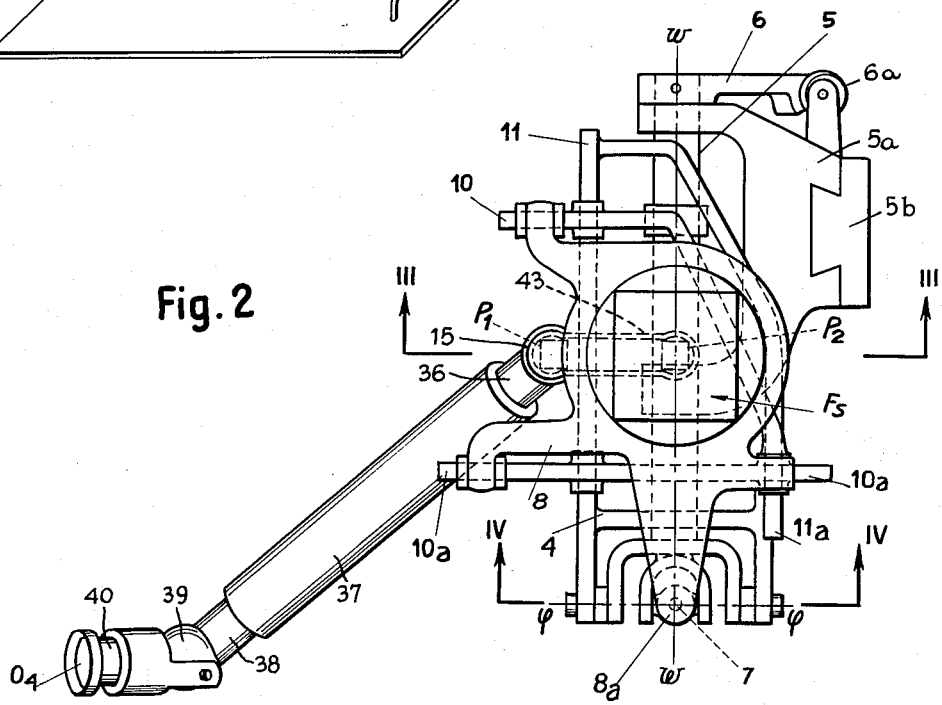
Fig. 2 is a plan view of a bearing assembly of a photogram.

As illustrated in Figs. 2 to 4, the rod 3 is spherically linked to the bearing structure 4 of the guides or slides, said structure being carried by the shaft 5 corresponding to the bearing shaft 18 of the above mentioned patent; the geometrical axis of said shaft coincides with the horizontal geometrical axis $\omega$ passing through the spherical link, materialising the optical centre $C_1$.

A geared sector 6, corresponding to the sector 19 of the above mentioned patent, is integral to the shaft 5 and said sector, by meshing an appropriate control member 6a, angularly orients the shaft 5. The shaft 5 is carried by a structure 5a slidable on a guide 5b. The rod 3 is extended above the spherical joint with a telescope arrangement and ends up with a spherical head 7, forming a connecting spherical joint between said rod 3 and an arm 8a of the bearing plate 8 of the photogram $F_s$, which is a portion of the pair of stereoscopic photograms. The bearing 8, carrying the photogram $F_s$, is slidably mounted on two slides 10—10a, which, on their turn, form a portion of the structure sliding on two slides 11—11a, perpendicular to the previous ones, in order to allow the sliding of the bearing 8 in a plane.

The tube 15, carrying the objective lens $O_1$ and the collimation mark $m_1$, forming a part of the observation optical system relative to the photogram $F_s$, is mounted onto the orientable structure 4 by means of a sleeve bearing 14. This optical system is completed by a differential mirror $S_1$ housed in a box 35; by a lens $O_2$ housed in a tube 36 integral to the box 35; by an Amici prism A carried by a tube 37 which is slidably mounted on the tube 36; by a second lens $O_3$, housed in a tube 38, which is slidably mounted in the tube 37; by a second mirror $S_2$, carried by a second box 39, which is integral with the tube 38; and by an ocular lens $O_4$ mounted on a tube 40. The tube 40 is held by a bearing 41 adjustable upon a stationary support 42. The arrangement is similar to that relative to each observation optical system of the two photograms of the above mentioned patent.

As a modification of the above mentioned patent, each optical system includes two deviating prisms $p_1$—$p_2$ in casing 43, which are designed to deviate the optical axis in order that the latter may describe a broken line, leading the last portion of the optical axis perpendicular to the photogram $F_s$ and particularly in accordance to a direction parallel to the geometrical axis of the tube 15 and coincident with the geometrical axis $\psi$.

By this arrangement, the photogram may be brought near the spherical joint 7. In fact, in the embodiment of Figs. 2 and 4, the centre of the photogram $F_s$ may be led onto the geometrical plane or near the geometrical plane passing through the geometrical axis $\omega$ (axis of the shaft 5) and perpendicular to the sliding geometrical plane of the photogram; the component y of the displacement of the photogram respect the spherical joint 7 is suppressed in this way.

In the modification illustrated in Fig. 5, the arrangement of the prisms $p_1$—$p_2$ is effected so that the optical axis of the last portion $\psi$ of the optical path, that is between the prism $p_2$ and the photogram $F_s$, passes through the meeting point of the geometrical axis $\omega$ and $\varphi$, coinciding with the geometrical centre of the spherical joint 7, around which the rod 3 pivots and which materialises the optical centre of projection. In this case, the portion of the optical axis, included between the prisms $p_1$—$p_2$, results to be inclined respect the projections of the geometrical axis $\omega$ and $\varphi$, in the projection of Fig. 4, in order that the centre of the photogram $F_s$ is substantially located in correspondence of the extension of the geometrical axis of the guide rod 3, when the latter lies in accordance to the axis of shooting camera. The mechanical actuation of the joint 7 may be actuated easily by who is skilled in art of the field, for example, by laterally displacing the slides which actuate the translation of the bearing 8 in its own plane.

The above mentioned improvements, besides allowing to attain a greater accuracy with the apparatus, as above mentioned, allow a larger liberty of arrangement for the bearing and rotation of the mechanical members, especially when large size photograms are used.

The actuation of the reflections may be different with respect to that illustrated and obtained by mirrors, as in the embodiment; the number of the reflections may also be modified, for instance, decreased and particularly increased with respect to the specified embodiment, always for the same purpose.

In the plotting apparatus according to the invention, the guide rods 2 and 3 are cylindrically shaped, rather than being semi-cylindrical hollow as in the known types. As the geometrical axis of said cylindrical rods could not apparently attain an actual intersection, said rods are provided with a particular arrangement, which is illustrated in detail in Figs. 6 and 7. According to said figures, the rings 21 and 22 form the upper universal bearing connecting the guide rod 3 to the structure 4 described in the previous figures, and the centre $C_1$ of the joint represents the geometrical axis of projection. The ideal geometrical axis passing through $C_1$, downwardly extended, cuts the ideal geometrical axis of the second guide rod 2, passing through $C_2$ in the point or spot I. While in the section over the universal joint of the centre $C_1$, respectively $C_2$, the mechanical axis of each guide rod 2 and 3 actually coincides with the ideal geometrical axis and the telescope sliding pins, carrying the spherical joints (as the one 7) are axially displaced along said axis, said spherical joints linking the rods to the bearings of the photograms, and said rods are mutually and parallelly displaced in the lower section by a certain amount d appropriate respect the ideal geometrical axis.

A transversal bearing t, carried by the carriage G (also see Fig. 1), supports a pivotal sleeve 23, formed with an integral stirrup 23' on which the pin 24a and the pivotal sleeve 24, engaging the guide rod 3, are hinged. A similar arrangement of sleeve coupling is provided between the guide rod 2 and the transversal bearing t.

This arrangement allows the ideal intersection of the continuation of the ideal geometrical axis belonging to the two guide rods and defined by the upper portions of the couplings, provided the following conditions be actuated:

(1) The geometrical axis of rotation of the ring 21 of the universal joint of the centre $C_1$, respectively $C_2$ must be parallel to the geometrical axis of the transversal bearing t;

(2) Each guide rod 2—3 must be arranged parallelly to the ideal geometrical axis of the same rod defined by the upper portion of the universal joint.

The arrangement, according to Fig. 8, is provided for the introduction of the vertical components $b_z$ of the shooting base, and in said arrangement the elements similar to those of the previous figures are denoted with the same references.

In this modification, the transversal bearing t, and preferably horizontal, which serves to connect the coupling joints of the guide rods 2 and 3, is divided in two portions or segments $t_1$ and $t_2$, preferably having the same length; each segment is integral to the outer end, with a bracket 25 and 26 respectively. Each bracket is provided at the other end with two threaded apertures 25a and 26a, wherein the screws 29 and 30 are engaged and which are controlled by the buttons 31 and 32, and which are borne by the transverse bar 33, forming a section of the carriage G. Each of said two segments $t_1$ and $t_2$ is provided at the inner end with a coulisse guide 17 and 18 respectively, actuated in such a way so that said segments may have a relative displacement, keeping the parallelism between the respective axis; said two guides are mutually and slidably engaged in the embodiment. These displacements, which are imposed by the control of the buttons 31 and 32, constitute the components of the base $bz$, right ($bzd$) and left ($bzs$) respectively.

What I claim is:

1. A mechanical projection photogrammetric plotting apparatus, composed of two symmetrical sections, each of which comprises a guide rod, universally hinged in the projection centre, a photogram bearing support rotatable around the same centre according to two orthogonal axes, a cross-slide on said support for holding a frame on which the photogram is mounted; a connection by means of a spherical joint between the upper end of the guide rod and said frame, so that for all the angular movements of the guide rod, there are such corresponding displacements of the cross-slide of the photogram to be in a condition to bring any point of it in correspondence with a collimation optical system, the end of said collimation optical system is carried by said support of the cross-slides and is arranged under the same photogram; said optical system being made up of a first tube which at the top bears a first objective lens and at the bottom a glass with a mark, said first tube holding under the mark a first box which contains a first pivotal mirror which rotates for a half of the angle over which said first tube and a second tube connected to said first box rotate relative to each other, said second tube bearing a second objective and holding a third coaxial tube, rotatable and sliding on it, and containing an Amici prism, said third tube being in turn connected to a fourth tube, bearing a third objective and united to a second box, similar to the first, containing a second pivotal mirror, said box being in turn connected to a fifth tube, to which the observation ocular is applied, said apparatus being characterized by the fact that it comprises means to actuate reflections on optical surfaces in the portion included between the photogram and said first objective of the optical path of the collimation optical system of each photogram, in order to allow such an arrangement of the photogram as to be reduced also until the annulment of at least one of the components ($x-y$) of displacement of the photogram with respect to the spherical joint between the upper end of the rod and the photogram holding frame.

2. A photogrammetric plotting apparatus, as in the claim 1, wherein the reflecting means include two right angle reflecting prisms.

3. A photogrammetric plotting apparatus according to claim 1 further including: two cylindrical guide rods, each actuated in the portion above the universally hinged joint arranged in the projection centre with the mechanical axis coinciding with the geometrical axis, and in the lower portion with the mechanical axis displaced parallelly with respect to said geometrical axis, a carriage movable tridimensionally for the determination of the plotted point, two universal joints connecting the guide rods to said carriage, each of said universal joints including a shaft connected to said carriage and common to the two universal joints, a first sleeve rotatable around said shaft, a right-angled stirrup integral with said first sleeve, a second sleeve rotatably connected to said stirrup, said second sleeve being connected to the lower portion of the corresponding guide rod, said rods being arranged on opposite sides of said shaft and being offset from said shaft at a distance corresponding to the distance between the respective rods and the centre of an ideal geometrical axis.

4. A photogrammetric plotting apparatus according to claim 1 further including: two cylindrical guide rods, each actuated in the portion above the universally hinged joint arranged in the projection centre with the mechanical axis coinciding with the geometrical axis, and in the lower portion with the mechanical axis displaced parallelly with respect to said geometrical axis, a carriage movable tridimensionally for the determination of the plotted point, two universal joints connecting the guide rods to said carriage, each of said universal joints including a shaft connected to said carriage, a first sleeve rotatable around said shaft, a right-angled stirrup integral with said first sleeve, a second sleeve rotatably connected to said stirrup, said second sleeve being connected to the lower portion of the corresponding guide rod, said rods being arranged on opposite sides of said shaft and being offset from said shaft at a distance corresponding to the distance between the respective rod and the centre of an ideal geometrical axis, connecting means between the shafts of said latter two joints, and other connecting means between each of said shafts and the carriage in order to cause relative displacements between the two shafts and to keep them mutually parallel, such displacements providing the vertical axial component of movement of the instrument.

References Cited in the file of this patent

UNITED STATES PATENTS

| | | |
|---|---|---|
| 1,467,163 | Hugershoff | Sept. 4, 1923 |
| 1,858,353 | Aldis | May 17, 1932 |
| 2,085,498 | Horner | June 29, 1937 |
| 2,492,870 | Kelsch | Dec. 27, 1949 |
| 2,552,975 | Kelsch | May 15, 1951 |
| 2,574,123 | Santoni | Nov. 6, 1951 |